United States Patent [19]
Donato et al.

[11] Patent Number: 6,004,601
[45] Date of Patent: Dec. 21, 1999

[54] HIGH-CONCENTRATION-SHORT-TIME ZINC BLANCH FOR COLOR AND TEXTURE IMPROVEMENT OF THERMALLY PROCESSED GREEN VEGETABLES

[75] Inventors: Katja K. Donato, Sacramento, Calif.; June W. Sabo, Voorhees, N.J.; Joseph W. DeVerna, Sandwich, Mass.

[73] Assignee: Campbell Soup Company, Camden, N.J.

[21] Appl. No.: 09/061,190

[22] Filed: Apr. 17, 1998

[51] Int. Cl.$^6$ ........................................................ A23L 1/27
[52] U.S. Cl. ........................... 426/270; 426/267; 426/268; 426/508; 426/509; 426/321; 426/325
[58] Field of Search ..................... 426/267, 270, 426/268, 508, 509, 321, 325

[56] References Cited

U.S. PATENT DOCUMENTS

| | | | |
|---|---|---|---|
| 4,473,591 | 9/1984 | Segner et al. | 426/270 |
| 4,478,860 | 10/1984 | Hekal et al. | 426/267 |
| 4,521,439 | 6/1985 | Bengtsson et al. | 426/509 |
| 4,615,924 | 10/1986 | Hekal et al. | 428/35 |
| 4,840,808 | 6/1989 | Lee et al. | 426/270 |
| 5,114,725 | 5/1992 | Leake et al. | 426/270 |
| 5,482,727 | 1/1996 | LaBorde et al. | 426/270 |
| 5,556,655 | 9/1996 | Vadlamani et al. | 426/270 |
| 5,599,572 | 2/1997 | Bourne | 426/321 |
| 5,607,712 | 3/1997 | Bourne | 426/321 |

OTHER PUBLICATIONS

Gupte et al., "Effect of pH Adjustments and High–Temperature Short–Time Processing on Color and Pigment Retention in Spinach Purée," *Food Technology*, V. 18, pp. 1645–1648, Oct. 1964.

Tan et al., "Effect of Processing Temperature on Pigments and Color of Spinach," *J. Food Science*, V. 27, pp. 232–241, 1962.

LaBorde et al., "Chlorophyll Degradation and Zinc Complex Formation with Chlorophyll Derivatives in Heated Green Vegetables," *J. Agric, Food Chem*, V. 42, No. 5, pp. 1100–1103, 1994.

LaBorde et al., "Zinc Complex Formation in Heated Vegetable Purees," *J. Agric. Food Chem.*, V. 38, No. 2, pp. 484–487, 1990.

von Elbe et al., "Pigment Composition nd Color of Conventional and Veri–Green Canned Beans," *J. Agric. Food Chem.*, V. 34, No. 1, pp. 52–54, 1986.

Jones et al., "Experimental Formation of Zinc and Copper Complexes of Chlorophyll Derivatives in Vegetable Tissue by Thermal Processing," *J. Agric. Food Chem.*, V. 25, No. 1, pp. 149–153, 1977.

von Elbe, "Improving the Color of Canned Green Vegetables: Chlorophyll Degradation in Thermal Processing Brings Color Change and Lost Consumer Appeal. Green Metallo–Compleses may Offer an Answer," *Food & Bev. Tech. Int'l USA*, pp. 843–845, 1989.

*Primary Examiner*—Chhaya D. Sayala
*Attorney, Agent, or Firm*—Banner & Witcoff, Ltd.

[57] ABSTRACT

A method for green color retention and texture improvement in vegetables by blanching raw or IQF green vegetables in an aqueous zinc blanch solution for three minutes or less, wherein the aqueous blanch solution has a zinc ion concentration of at least about 500 ppm. The vegetables may then be containerized and sterilized, frozen or dried. The zinc-blanched and frozen or dried vegetables may be sold as ingredients to the food industry, or they may be containerized and sterilized in brine, or in complex products, such as soups, sauces, or any other thermally processed products.

18 Claims, 20 Drawing Sheets

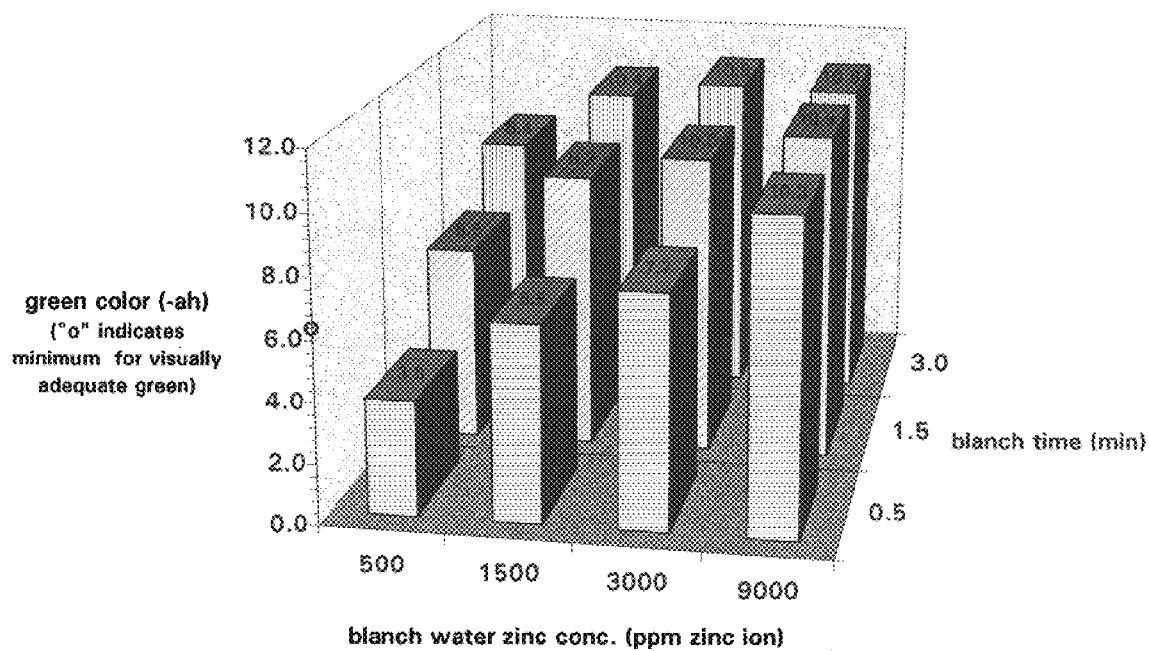
Fig. 1A: Color of HCST-Treated IQF Broccoli

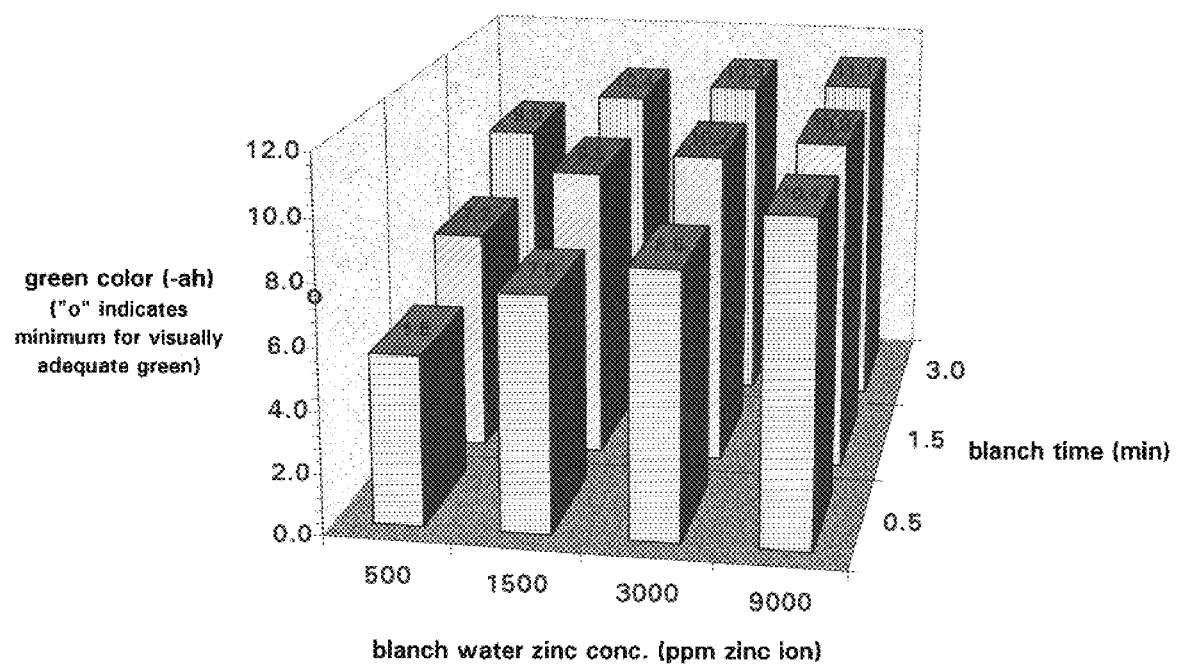
Fig. 1B: Color of HCST-Treated IQF Green Beans

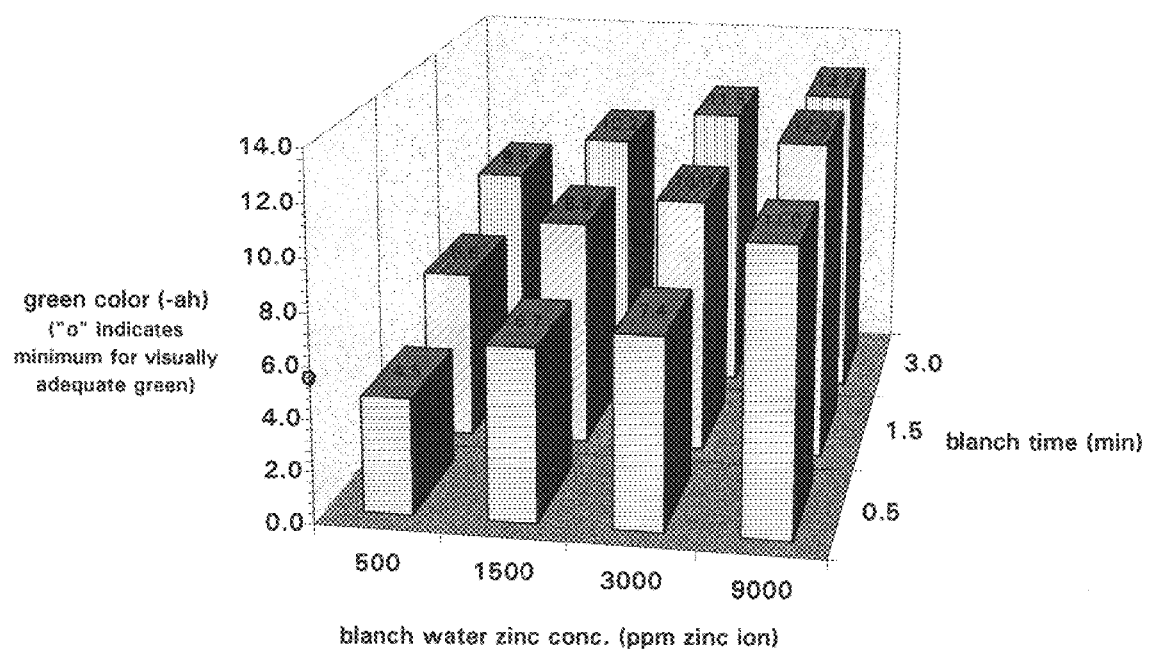

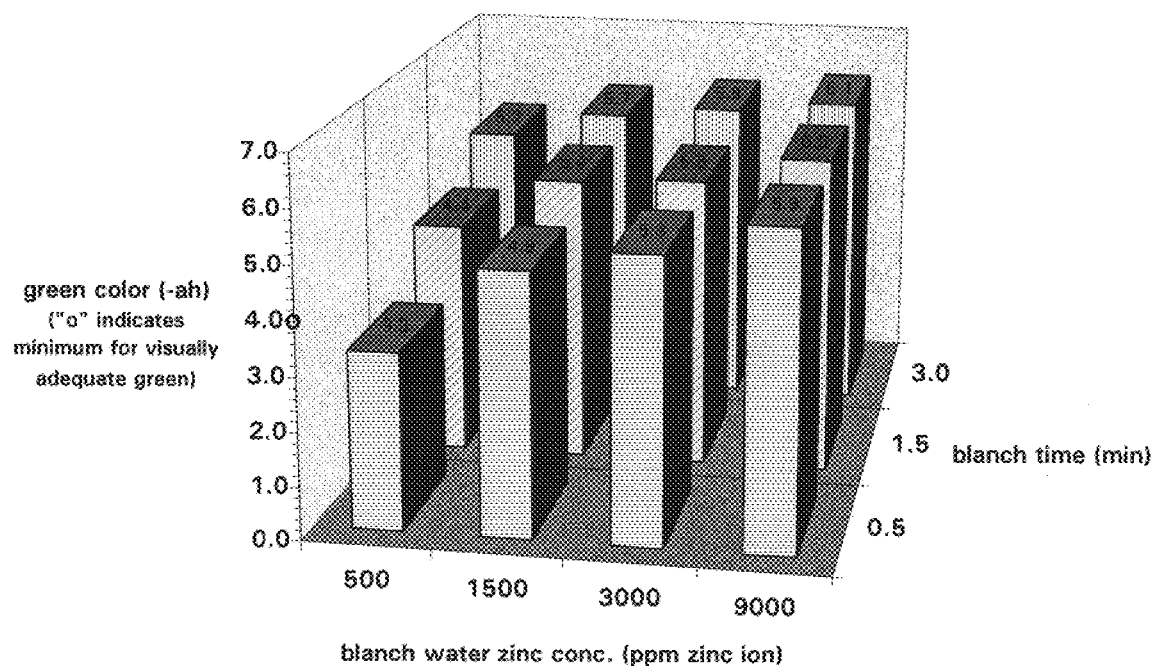

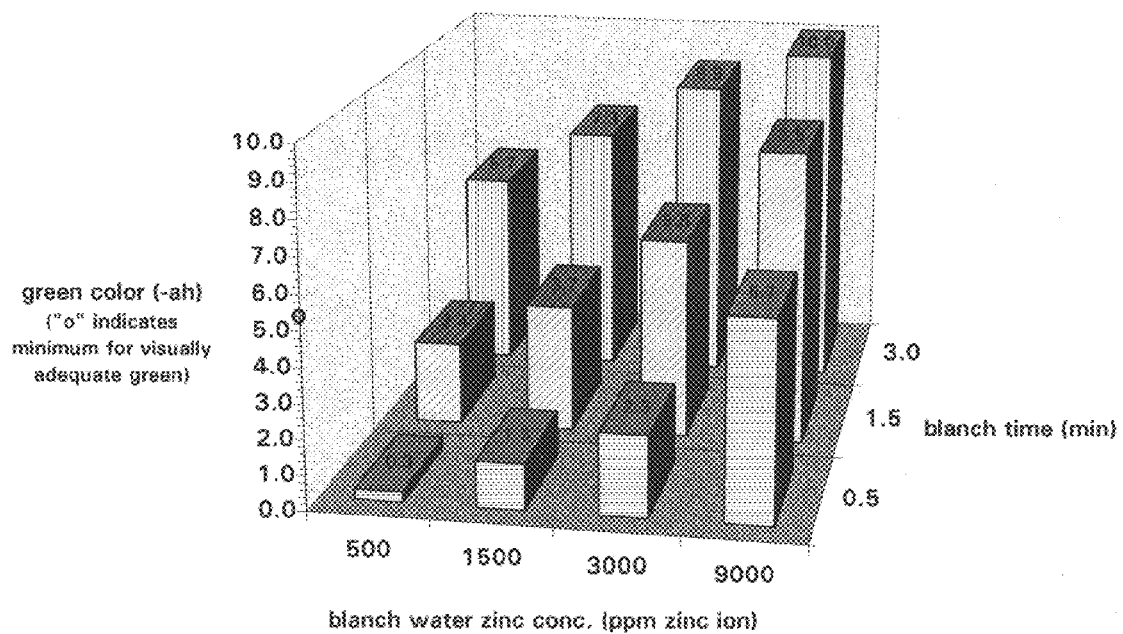
Fig. 1E: Color of HCST-Treated Fresh Broccoli

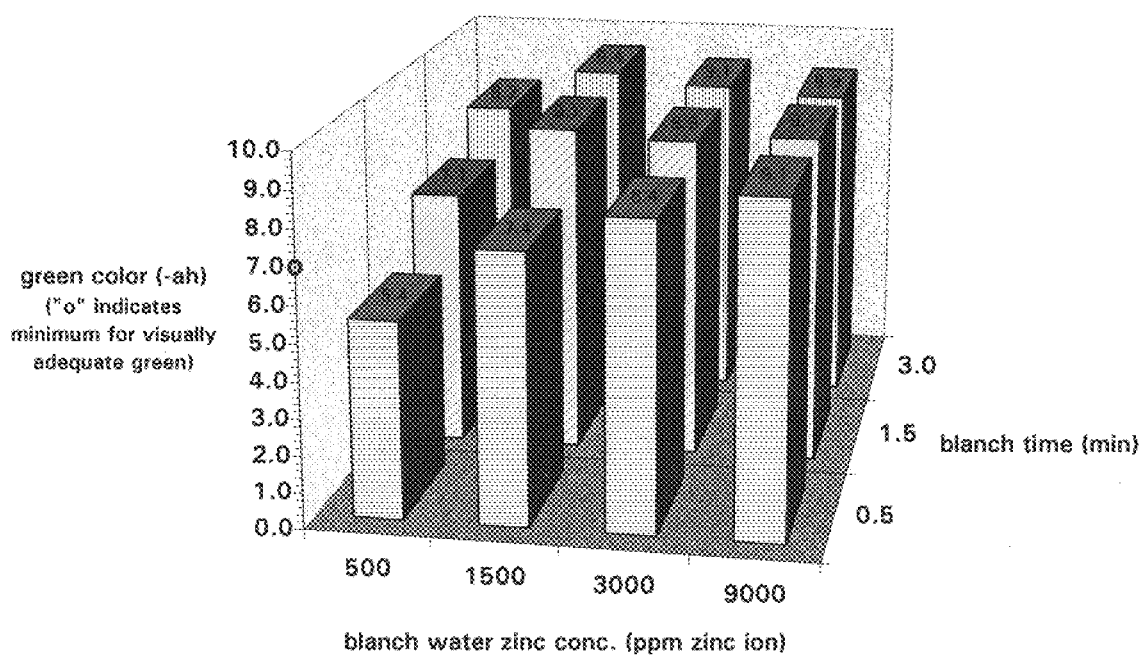
Fig. 1F: Color of HCST-Treated Celery

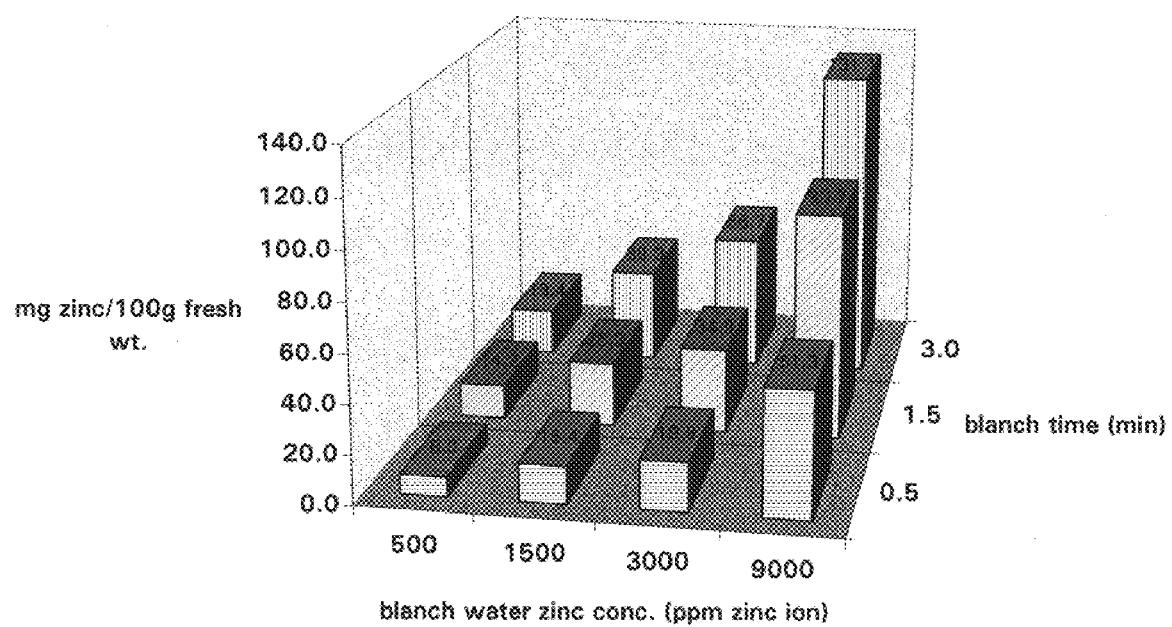
Fig. 2A: Zinc Content of HCST-Treated IQF Broccoli

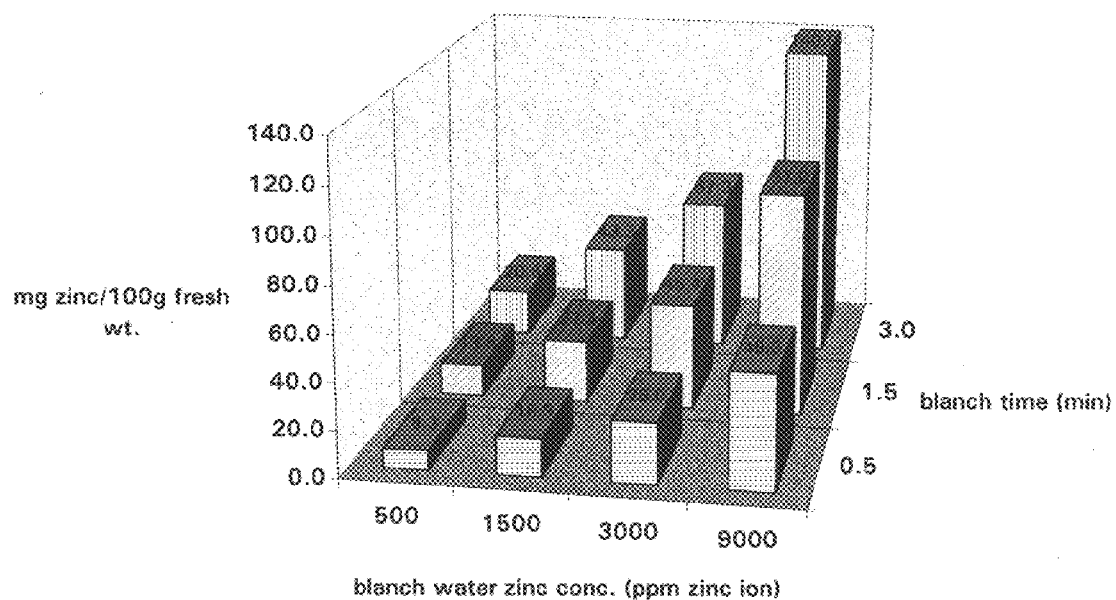
Fig. 2B: Zinc Content of HCST-Treated IQF Green Beans

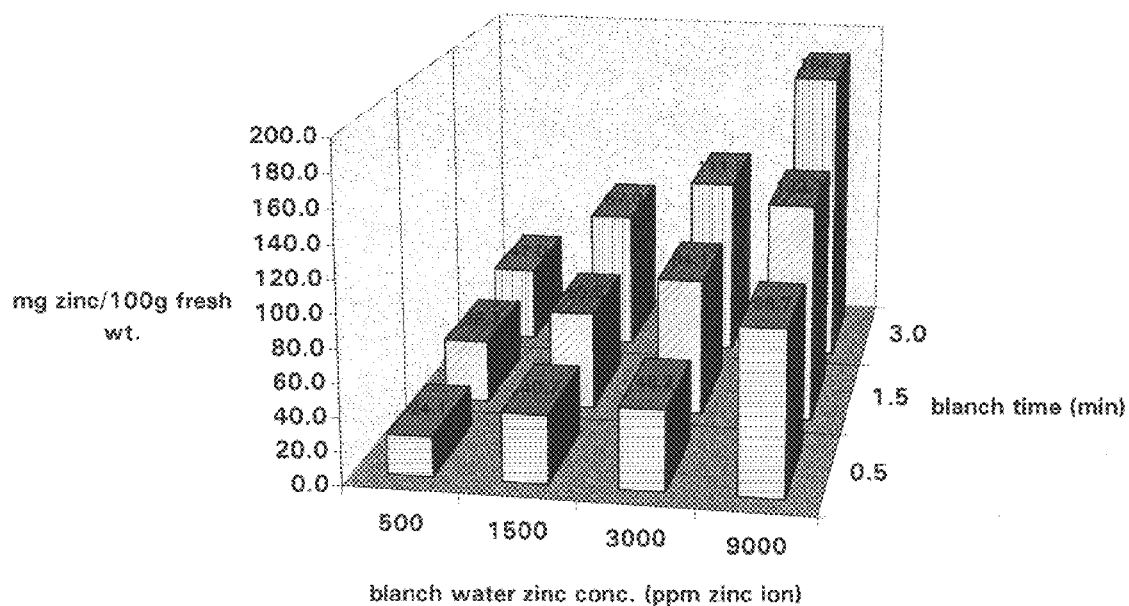
Fig. 2C: Zinc Content of HCST-Treated IQF Green Peas

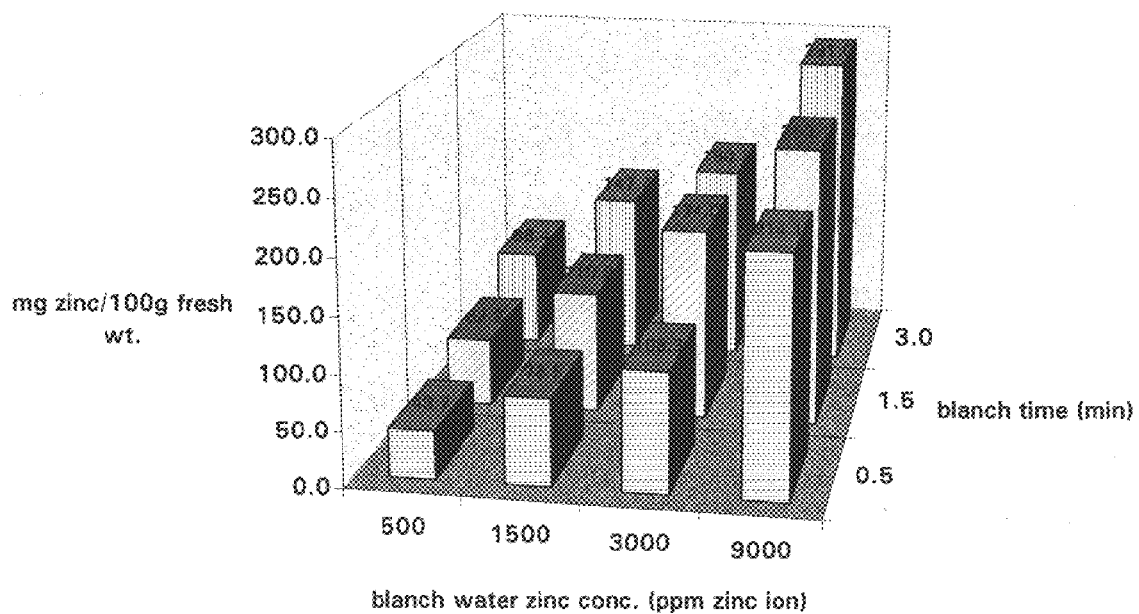
Fig. 2D: Zinc Content of HCST-Treated IQF Spinach

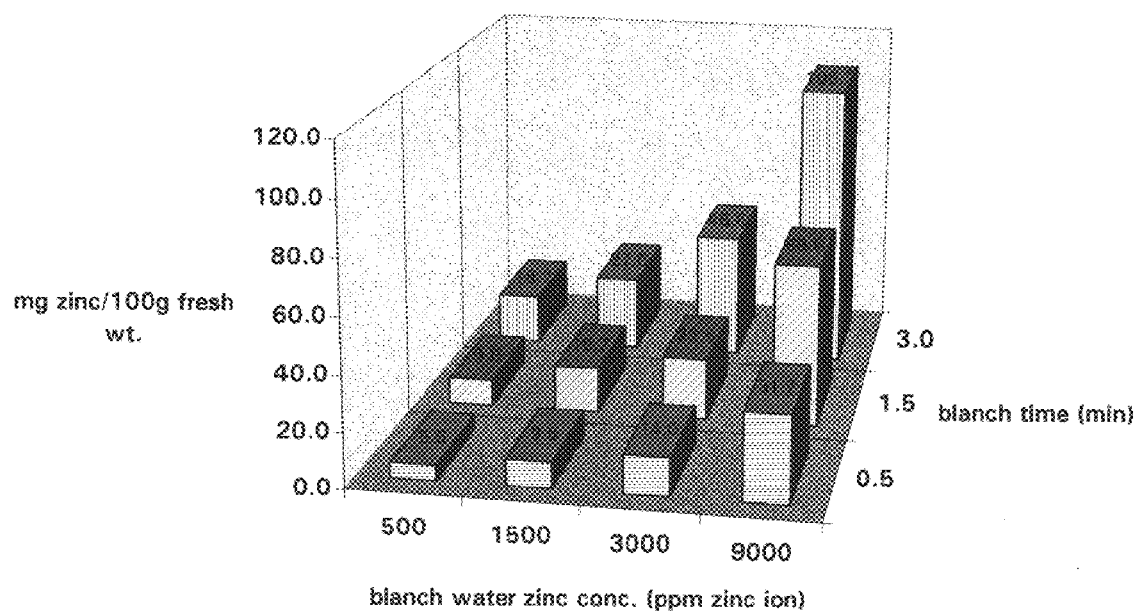
Fig. 2E: Zinc Content of HCST-Treated Fresh Broccoli

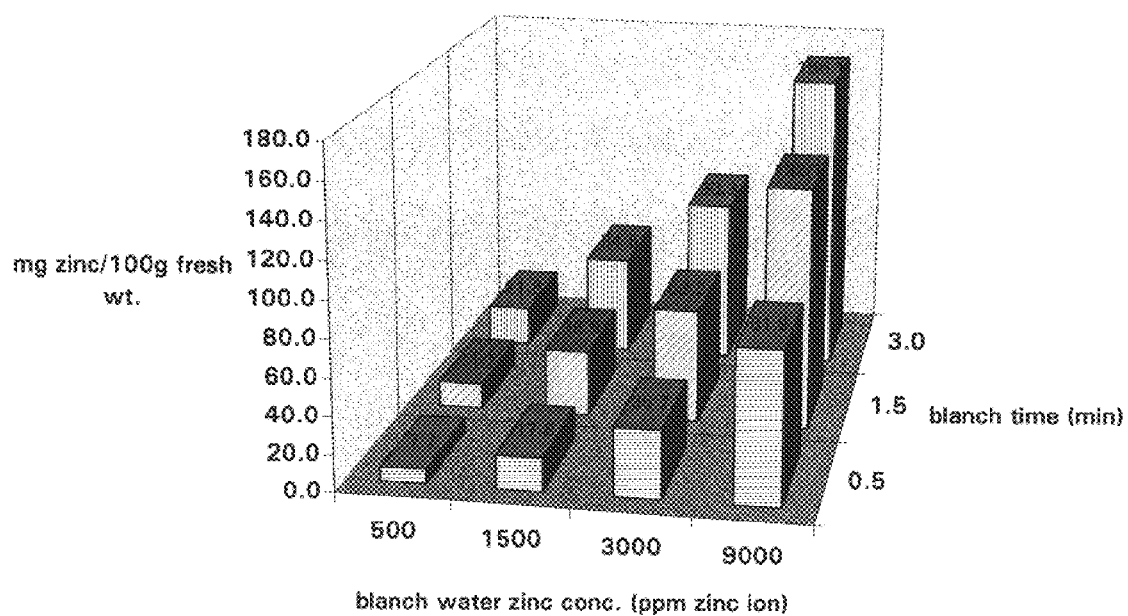
Fig. 2F: Zinc Content of HCST-Treated Celery

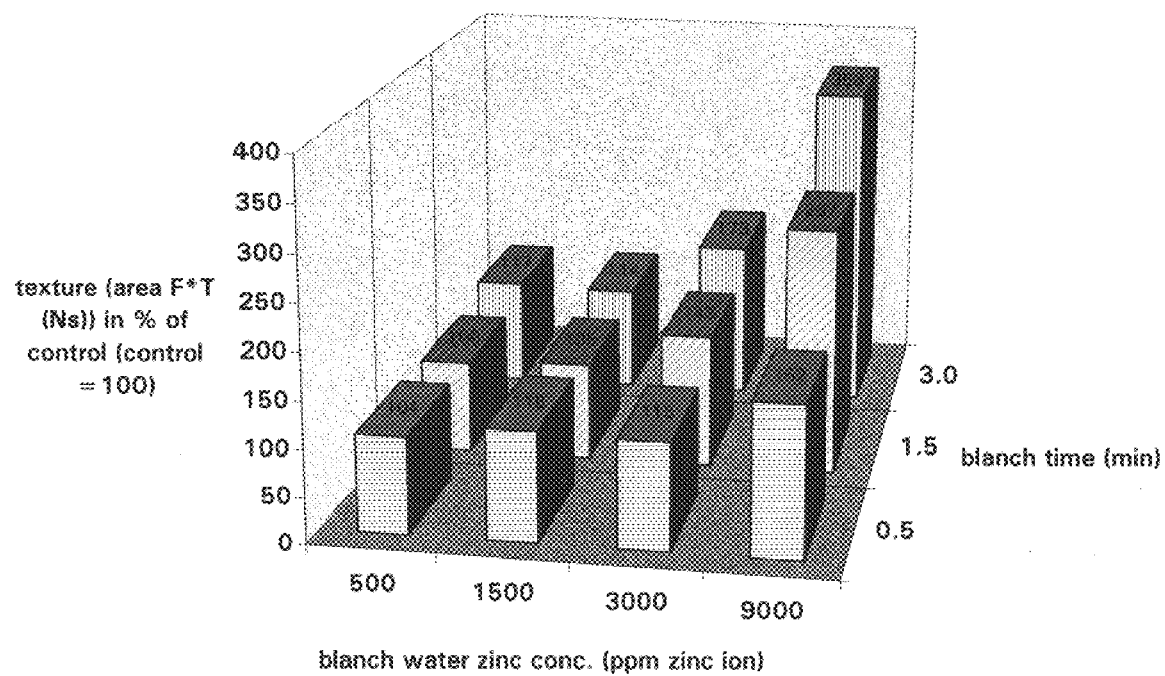

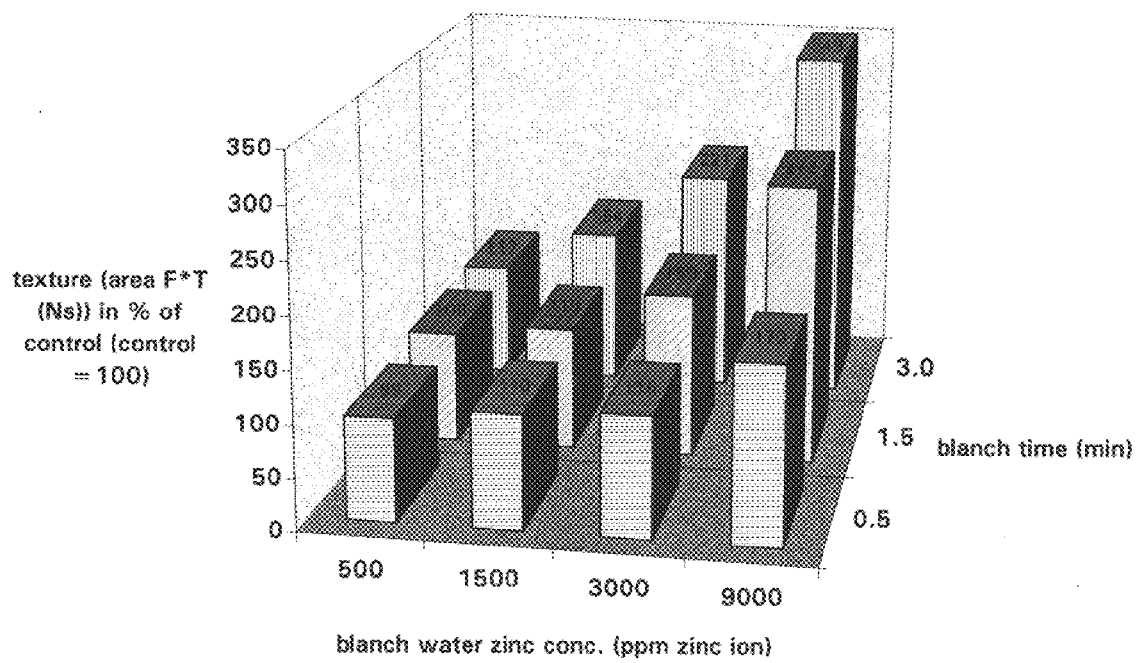
Fig. 3B: Texture of HCST-Treated IQF Green Beans

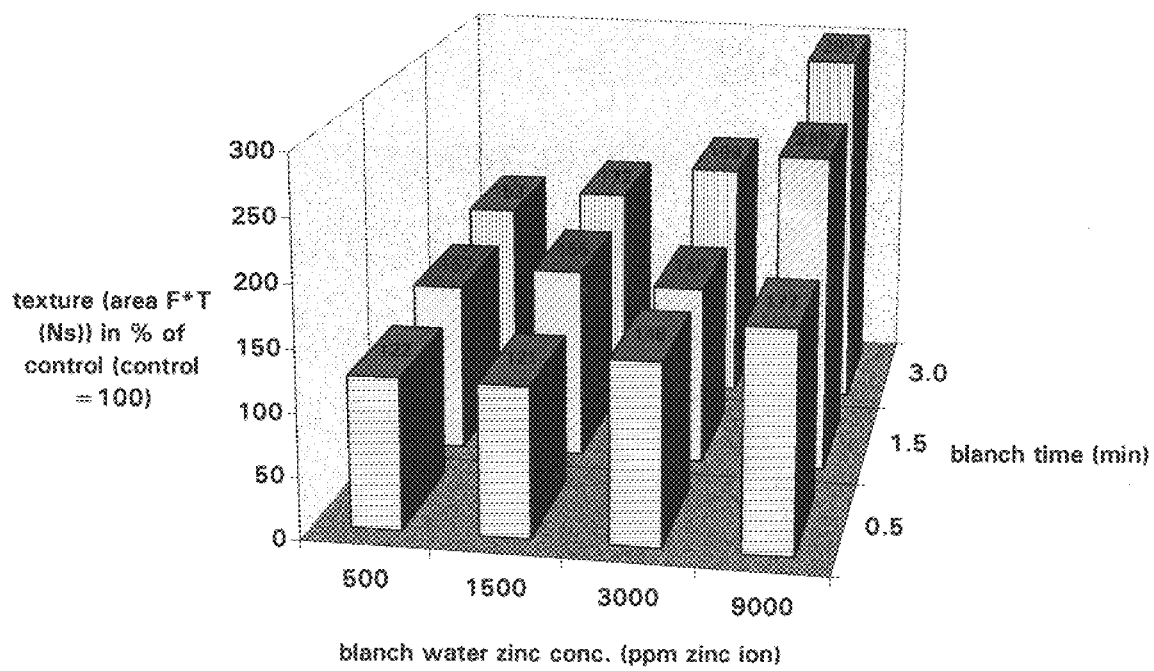
Fig. 3C: Zinc Content of HCST-Treated IQF Green Peas

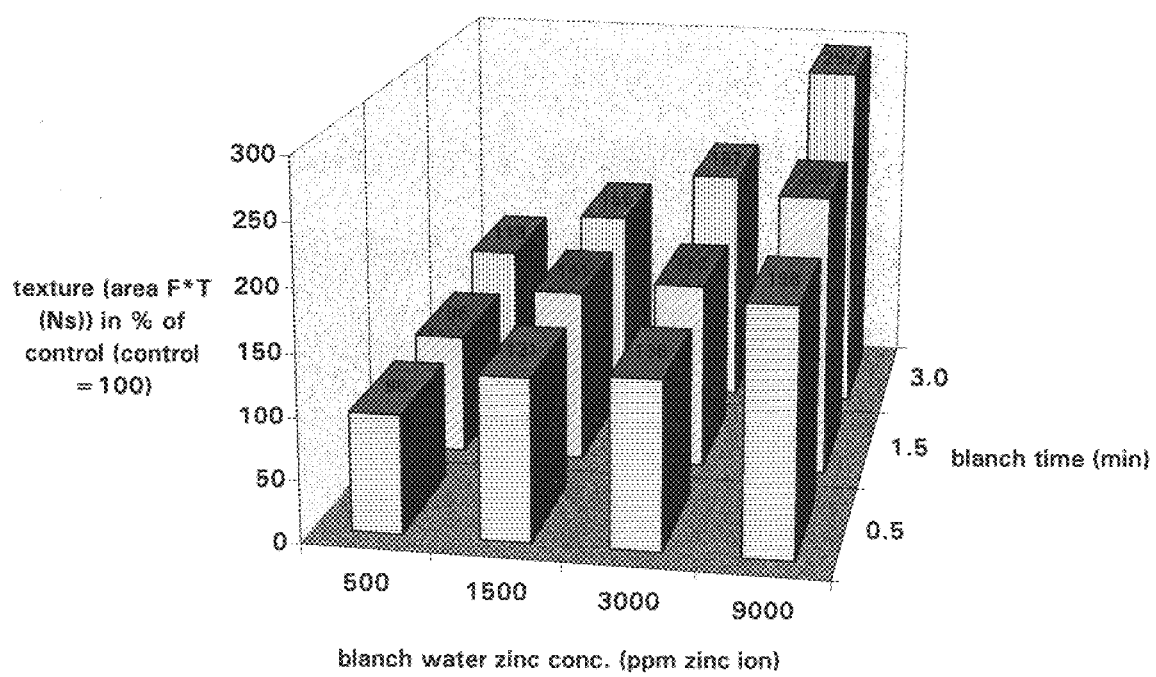
Fig. 3D: Texture of HCST-Treated IQF Spinach

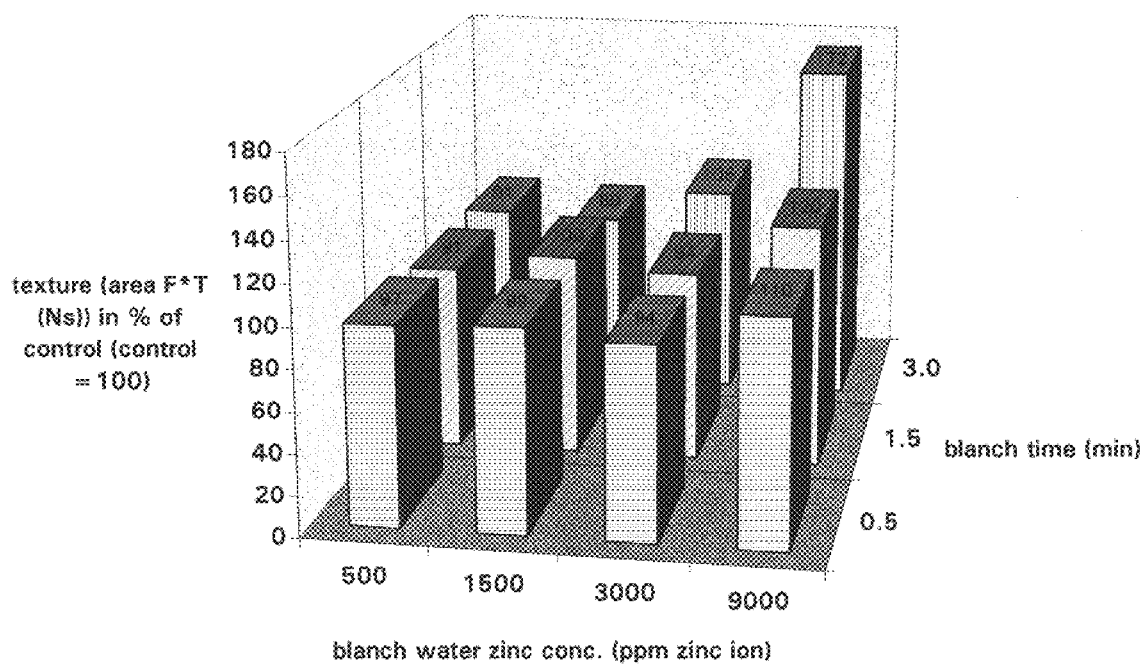
Fig. 3E: Texture of HCST-Treated Fresh Broccoli

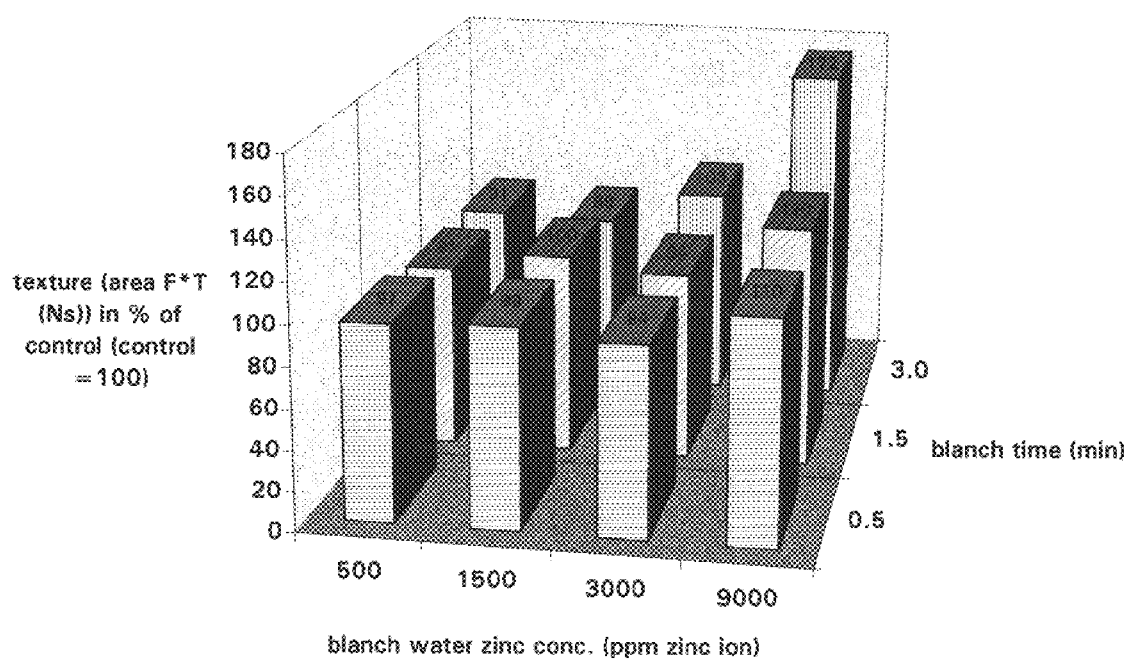
Fig. 3F: Texture of HCST-Treated Fresh Broccoli

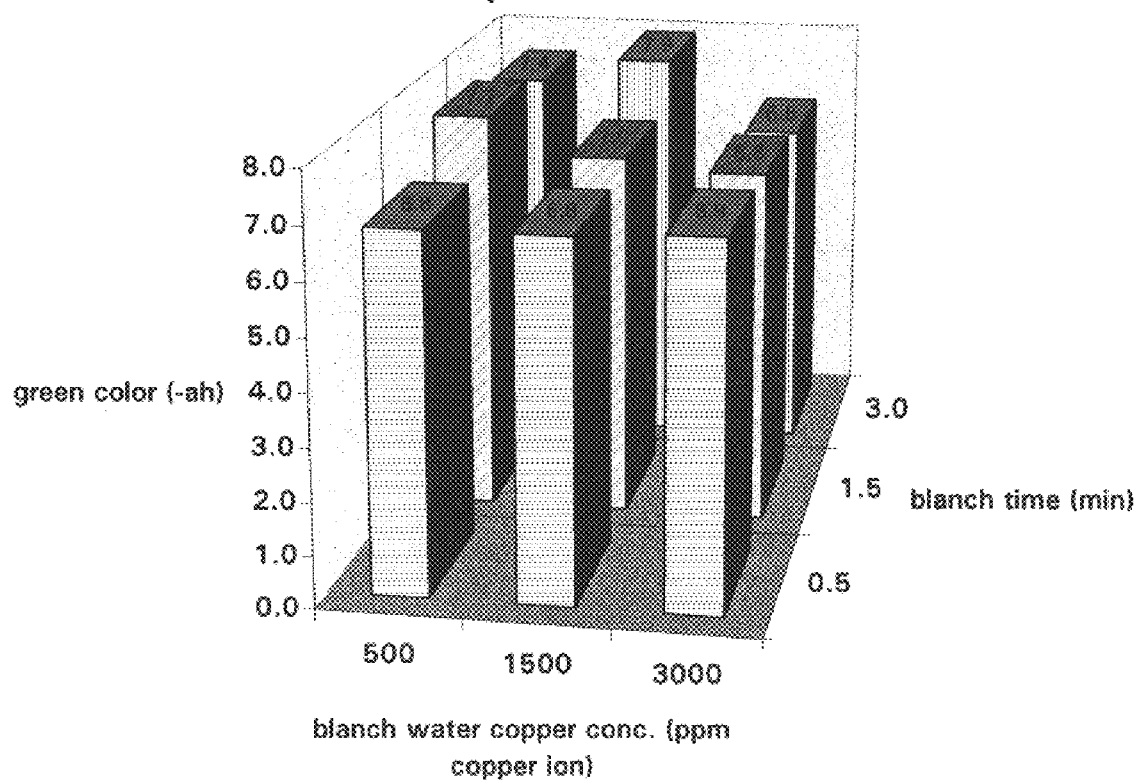

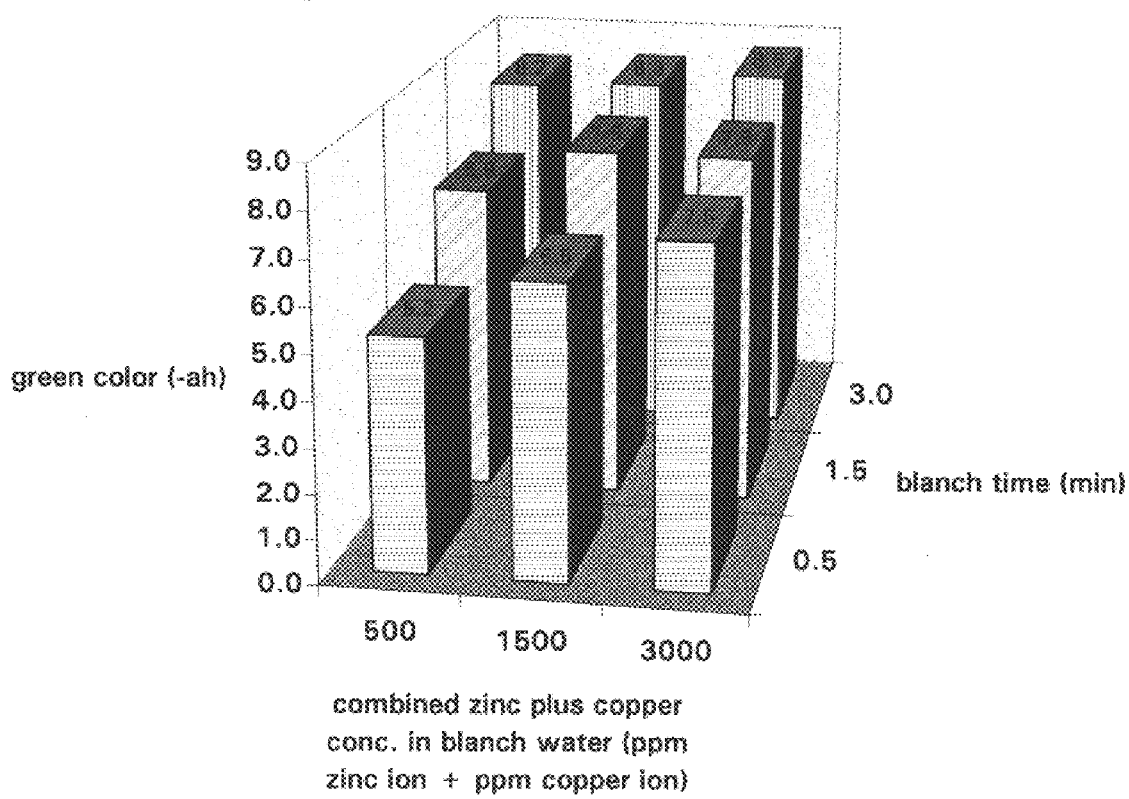
Fig. 4B: IQF Broccoli Color After HCST-Treatment With Cupric Sulfate and Zinc Chloride

HIGH-CONCENTRATION-SHORT-TIME ZINC BLANCH FOR COLOR AND TEXTURE IMPROVEMENT OF THERMALLY PROCESSED GREEN VEGETABLES

BACKGROUND OF THE INVENTION

1. Field of the Invention

The invention is directed to improving color and texture of green vegetables that are containerized and sterilized. A high-concentration short-time zinc blanch (HCST) method is introduced through which the bright green color of fresh vegetables is maintained through the thermal sterilization process.

2. The Prior Art

Vegetables and vegetable products, such as soups, are containerized and thermally sterilized in order to attain shelf life stability. This obvious advantage of shelf life stability brings along inherent disadvantages for the product, such as changes in flavor, texture, and color.

Visually most noticeable among the temperature-induced thermal processing changes may be the color change of green vegetables, from bright green to an unappealing olive color. At the biochemical basis of this color change is the chlorophyll molecule, the molecule responsible for the green color of vegetables. Its structure is that of a complex molecule with a magnesium atom in the central position. Accumulative heat input, either through extended cooking or through thermal sterilization in containers, causes the magnesium atom to be displaced from its central position. This change at the molecular level, from chlorophyll to pheophytin, coincides with a color change in the vegetable, from bright green to olive (Gold & Weckel, 1959; MacKinney & West, 1940; Westcott et al., 1955).

While the magnesium loss from the chlorophyll molecule is irreversible, the change in color is not. Spontaneous "regreening" of green vegetables was first reported in canned okra in 1943 (Fischbach and Newburger) and was attributed to zinc-containing pigments (Fischbach, 1943). Zinc and copper complexes of pheophytins formed and regreened pea puree during storage (Schanderl et al., 1965). Copper or zinc ions, as contaminants in process solutions, caused sporadic bright green color in processed green beans (Decleire, 1966) and Brussel sprouts (Swirski et al., 1969). Regreening through formation of zinc or copper complexes has also been shown experimentally (Jones et al., 1977; vonElbe et al., 1986).

The addition of zinc or copper salts for the retention of green color in canned vegetables has been reported in several prior art processes, all of which include one or more serious obstacles to implementation in a modern vegetable processing operation.

For example, U.S. Pat. No. 5,114,725 describes a lengthy process in which vegetables are first blanched and then containerized with a brine solution containing zinc and/or copper ions. Subsequently, the canned vegetables are held at an elevated temperature for 15 to 90 minutes after which they are sterilized according to commercial guidelines. This sterilization process may be followed by additional thermal treatments to further enhance the green color. It is suggested that vegetables preserved in such a manner may be used as ingredients in secondary products. This process has several drawbacks, the most important ones being the lengthy processing time and the impracticality of having to open cans to obtain ingredients for secondary products such as soups. Neither visual color ratings nor instrumental results are provided to support the claim of regreened vegetable color. In addition, no mention is made of a comparison of the regreened color to that of the fresh vegetable.

Similarly, U.S. Pat. No. 5,482,727 is characterized by a lengthy and complex process. Two different methods are presented. In the first one, vegetables are subjected to an extended pre-blanch hold of up to 60 minutes duration, then packed into cans with zinc or copper solution, and sterilized. The second method consists of an elevated temperature hold of the vegetables in water, followed by a blanch in zinc or copper ion solution, and subsequent packing and sterilizing of the vegetables in cans. In order to increase efficiency of the zinc blanch, acidification to pH 5 and the use of deionized water are advised, yet two more hurdles to the simplification that is desirable in a commercial processing operation.

In contrast, U.S. Pat. No. 4,473,591 provides a simplified method having reduced processing time for the preservation of green color in vegetables. Examples are directed to treatments of green beans, green peas, and spinach, which are separately blanched in a zinc or copper ion solution for 5 to 6 minutes, after which they are packed into cans and sterilized. Blanch water metal ion concentrations of 50 to 500 ppm are employed in this method. Although the described method appears to be much more practical than any of the others above, even 5 minute blanch times exceed those practiced in today's commercial vegetable blanching operations.

A color preservation blanch method that is to be used economically at a modern vegetable producer must accommodate large production volumes, without introducing unnecessary delay. Preferably, the method is accommodated within the extremely short blanch times in continuous blanching equipment. For instance, broccoli blanch times at a commercial facility typically range from 65 to 105 seconds, while green bean and green pepper blanch times vary between 1.5 and 2.5 minutes.

The second most noticeable effect of temperature is that it changes texture. This change typically softening, is, to a certain extent, desirable, since cooked vegetables are easier consumed and digested than raw vegetables. However, the degree of softening that is achieved through commercial sterilization processes exceeds most consumer's sensory preference.

Fresh vegetables owe their crispness largely to complex pectin molecules in the cell walls. Stanley et al. (1995) describe that the heating of vegetables causes cell separation due to thermal destablilization of pectic materials. The complex pectins are broken into subunits, a process that is concurrent with structure loss. As for the above described color change, this texture change is preventable. The endogenous pectin methyl esterase (PME) has the potential of cross-linking the pectin subunits with calcium ions, which are present in the vegetable tissue and can also be added via the blanch solution. Thus, calcium ion "bridges" between the subunits form complex pectin polymers, yielding a product of increased firmness.

Two prior art processes for texture improvement of vegetables to be frozen use the above described firmness enhancing potential of pectin methyl esterase. U.S. Pat. No. 4,521,439 describes a process of three consecutive blanch steps: First, a 1 to 30 second steam blanch at 90 to 100° C.; second, a 1 to 60 minute water blanch at 45 to 90° C.; and optionally a third step consisting of a 30 second to 5 minute blanch between 80 to 100° C. Vegetables treated in such manner were frozen and later compared to conventionally blanched and frozen control vegetables. After cooking vegetables from both treatments, the vegetables blanched in the three-step process had improved texture over the texture of the conventionally treated vegetables.

U.S. Pat. No. 5,607,712 describes a two step procedure for the texture improvement of vegetables that are frozen and later canned. Here the steps consist of (1), a 2 to 60 minute low temperature blanch at 125 to 155° F. for pectin methyl esterase activation, and (2), a 2 to 10 minute blanch at 190 to 210° F. for enzyme deactivation. The observed firming effect is said to be accentuated through the addition of calcium salt and/or acid to the blanch water of the first step. This process is limited to the use of fresh vegetables that are to be frozen and later canned.

None of the prior art processes for the purpose of green color retention describe any effects on texture. It is believed that the low zinc ion concentrations used in the prior art processes do not provide texture-enhancing effects.

SUMMARY OF THE INVENTION

The present invention is directed to a practical method for green color retention which can be incorporated into current vegetable processing conditions in continuous blanching equipment, and which alternatively can be used in a kettle/batch processing situation.

A short time zinc blanch of 0.5 to less than 3 minutes, which provides adequate green color retention and some texture improvement during subsequent retorting of the treated vegetables, is introduced. Due to its reduced time requirements, this high-concentration short-time (HCST) zinc blanch can take place under current commercial vegetable processing conditions. The HCST-treated vegetables may be used in any of the following ways:

immediately containerized and sterilized frozen and later containerized and sterilized dried and later containerized and sterilized frozen or dried and sold as ingredients to the food industry containerized and sterilized as ingredients within a complex product, such as a soup, a sauce or any other thermally processed product.

If further improvement of vegetable firmness is desired, the HCST blanch may be combined with either or both of two additional processing steps: (1) preceding the HCST blanch, a low-temperature long-time blanch (LTLT) for pectin methyl esterase activation may be applied, and/or (2) following the HCST blanch, drying of the vegetable can be used for enhancement of firmness.

In the HCST blanch, raw or frozen vegetables are blanched in a hot zinc ion solution of greater than 500 ppm zinc ion concentration, for a period of 0.5 to less than 3 minutes. This time is sufficient to incorporate zinc ions into the vegetable tissue. During subsequent retorting, these zinc ions are forced into the central position of the pheophytin molecules, thus causing the desired green color retention. It is demonstrated for all exemplified vegetables that the amount of absorbed zinc and the intensity of green color on one hand, follow the length of blanch time and blanch water zinc concentration on the other hand. This relationship can be used to modify the blanch conditions in order to achieve a desired shade of green in the vegetable.

With the HCST method, green color retention and some texture improvement were demonstrated in IQF (individually quick frozen) green peas, green beans, spinach, broccoli, and asparagus, as well as in fresh broccoli, celery, and chives. Additional texture improvement through the LTLT blanch and the final drying step were shown in fresh broccoli. Fresh spinach was shown to regreen in HCST blanches following a non-zinc pre-blanch of 105 seconds duration. Although a great number of green vegetables respond well to the HCST method of the claimed invention, others may not respond as well and the processor should consider whether this process is suitable for the particular vegetable being treated.

In the LTLT blanch, fresh vegetables are blanched in blanch water which may contain a food grade calcium salt and/or a food grade acid, at 125 to 155° F. for 2 to 60 minutes. Optionally, the vegetables may then be heated at a temperature up to 155° F. for 0 to 90 minutes. The LTLT blanch and hold is immediately followed by the HCST blanch, after which the vegetables may be dried.

BRIEF DESCRIPTION OF THE DRAWINGS

FIGS. 1A–1F show color results of zinc concentration and blanch time for different HCST-treated vegetables.

FIGS. 2A–2F show zinc content results of zinc concentration and blanch time for different HCST-treated vegetables.

FIGS. 3A–3F show texture results of zinc concentration and blanch time for different HCST-treated vegetables.

FIGS. 4A–4B show color results of copper concentration and blanch time for HCST-treated broccoli using cupric sulfate without and with zinc chloride, respectively.

DETAILED DESCRIPTION OF THE PREFERRED EMBODIMENTS

In accordance with the present invention, raw or IQF vegetables are first blanched in a highly concentrated zinc ion aqueous blanch solution for a very short time ("high-concentration short-time" or HCST blanch). The zinc ion concentration in the aqueous blanch solution is at least 500 ppm, preferably 750 to 3,000 ppm, more preferably 1,000 to 3,000 ppm. There is no upper limit contemplated and the present process works with concentrations at least as high as 9,000 ppm, but for economical reasons, zinc concentrations of 750 to 3,000 ppm are preferred. The actual zinc concentration used in the blanch solution will depend on the blanch time, the type of vegetable being blanched, and the desired level of green color retention.

The zinc concentration in the aqueous blanch solution is preferably obtained from zinc salts exhibiting high water solubility such as zinc chloride, zinc sulfate, zinc citrate, and zinc acetate. Copper salts such as cupric sulfate, and combinations of copper salts with zinc salts, may be used as well. Many zinc and copper salts are non-toxic and Generally Recognized As Safe (GRAS) by the FDA and are included in U. S. government Recommended Daily Allowances.

Preferably, zinc chloride is used; to ease its handling in the plant, commercially available zinc chloride solution is recommended. No pH adjustment of the blanch solution is necessary; however, adjustment of the pH to within the range of 5.0 to 7.2 does not inhibit the process. The process is not limited to any special water quality; good regreening results were achieved with tap water, RO-filtered water, distilled water, and Milli-Q-filtered water.

The HCST blanch works well over a range of different vegetable to blanch solution ratios. Although the examples presented in this application were completed using a 1:12 vegetable to blanch solution weight ratio, weight ratios all the way to 1:2 are equally successful. While the 1:12 weight ratio reflects the situation in a continuous blancher, the 1:2 weight ratio is typical for a kettle blanch process.

The vegetables do not have to be preheated before the HCST blanch; IQF vegetables may be used either frozen or thawed. The temperature of the blanch solution is generally between 150 and 212° F., preferably between 200 and 212° F. Most preferably, the blanch solution is boiling. The blanch time is between 0.5 and less than 3 minutes, preferably between 1 and 2 minutes. The actual blanch time depends on the blanch temperature, the blanch water zinc concentration, and the type of vegetable being blanched. For example, IQF green beans require a longer blanch time than IQF green peas, IQF spinach, or IQF broccoli. A range of blanch times, temperatures, and zinc concentrations are set forth in example 1 for a variety of vegetables; the table below lists typical zinc concentrations used as a function of the blanch time and the identity of the vegetable.

Typical HCST Blanch Times and Zinc Concentrations

| Vegetable | blanch water zinc ion concentrations (ppm) for 1 minute blanch | blanch water zinc ion concentrations (ppm) for 2 minute blanch |
| --- | --- | --- |
| IQF Broccoli | 2,000 | 1,000 |
| IQF Green Beans | 1,500 | 1,000 |
| IQF Green Peas | 1,000 | 750 |
| IQF Spinach | 1,000 | 750 |
| Fresh Broccoli | 6,000 | 3,000 |
| Fresh Celery | 1,500 | 1000 |

If a LTLT blanch is to precede the HCST process, the fresh vegetables will be blanched for 2 to 60 minutes at 125 to 155° F. in blanch water that may contain a calcium salt and/or an acid. Optionally, the vegetables may then be heated at a temperature up to 155° F. for 0 to 90 minutes. Following the LTLT blanch and optional hold, the HCST color retention blanch is applied to the vegetables, and a final drying step may follow the HCST blanch.

Suitable calcium salts include, but are not limited to, calcium chloride, calcium acetate, calcium gluconate, calcium lactate, and calcium sulfate. Preferably calcium chloride is used. Suitable food grade acids include, but are not limited to, ascorbic acid, citric acid, adipic acid, succinic acid, vinegar, acetic acid, phosphoric acid, lactic acid, tartaric acid, malic acid, fumaric acid, sulfuric acid, and glucono-delta-lactone (which hydrolyzes to gluconic acid in water). Attention is drawn to U.S. Pat. No. 5,607,712.

The amount of zinc that is actually incorporated into the vegetable during the HCST blanch is considerably less than the amount of zinc in the blanch solution. The goal is to achieve a satisfactory regreening result with minimum zinc uptake into the vegetable tissue. For example, after a 1.5 minute blanch in 3,000 ppm zinc ion solution, IQF broccoli is perceived to be of excellent green color at a Hunter color value of (−ah)=10.0, containing 34.9 mg zinc/100 g broccoli. After a 3 minute blanch in 9,000 ppm zinc ion solution, its green color is still perceived as excellent (now at (−ah)= 10.8) while its zinc content has risen to 131.1 mg/100 g broccoli. Economic considerations favor a shorter blanch time and a lower zinc concentration in the blanch.

At the end of the blanch time, the vegetables are removed from the blanch solution and rinsed in cold water for a period of 5 seconds to 5 minutes. After this, the vegetables can be containerized and sterilized or they may be frozen or dried for storage and later use. Retort times for the final products will depend on the characteristics of each product, the container size, and the sterilizer specifications; they are determined by commercial guidelines as well as through in-plant trials.

The process of the invention works well for both, fresh and IQF (individually quick frozen) vegetables. IQF vegetables may be used frozen or thawed. Suitable vegetables include but are not limited to asparagus, broccoli, celery, chives, green beans, green peas. Other possible suitable vegetables are kale, greens (e.g. mustard), and okra.

EXAMPLES

Example 1

The vegetables identified in the table below were subjected to a high-concentration short-time zinc blanch for regreening and texture improvement. HCST blanches were performed by submersion of vegetables, via dipping basket, in boiling zinc chloride solution in a 10 quart electric kettle. The blanch solution:vegetable ratio was about 12:1, i.e. about 500 g vegetables were blanched per 6 liters of blanch solution. Actual blanch temperatures were as listed below. At the end of the blanch time, vegetables were removed from the blanch solution and submerged in cold water for one minute. Vegetables were filled into 211×400 cans, covered with 1% salt brine of 170–180° F., and retorted in a still retort according to the conditions recorded below.

Retort and Blanch Conditions

| Vegetable | fill wt. per can (g) | sterilization time (at 250° F.) | 0.5 min. blanch temp (° F.) | 1.5 min. blanch temp (° F.) | 3 min. blanch temp (° F.) |
| --- | --- | --- | --- | --- | --- |
| IQF Broccoli | 150 | 26 | 200–204 | 200–210 | 200–212 |
| IQF Gr. Beans | 150 | 13 | 201–206 | 201–212 | 210–212 |
| IQF Green Peas | 150 | 19 | 200–205 | 200–212 | 200–212 |
| IQF Spinach | 120 | 35 | 195–205 | 195–212 | 195–212 |
| Fresh Broccoli | 120 | 26 | 201–206 | 201–212 | 201–212 |
| Fresh Celery | 130 | 13 | 201–205 | 201–212 | 201–212 |

Texture of samples was determined in a Kramer Shear Cell using a Texture Expert TA-XT2 from Stable Micro Systems. Following texture analysis, samples were homogenized with a Braun homogenizer. Color was determined using a TCM spectrophotometer (BYK-Gardener) equipped with a large optic head and sample cover, illuminant $D_{65}$ and a 2° observer angle. A number of samples were further analyzed for zinc content using the method described in *Mineral and Elements in Plants*, Methods of Analysis for Nutrition Labeling, ed. D. M. Sullivan and D. E. Carpenter, 1993, AOAC International, Arlington, Va, pp. 161–162.

Results on color, vegetable zinc content, and texture are pictured in FIGS. 1 through 3. Color effects of blanch water zinc concentration and blanch time are immediately apparent upon reviewing FIGS. 1a through 1f. For all exemplified vegetables, increasing zinc concentration and blanch time result in increasingly bright green vegetable color. A certain minimum combination of zinc concentration and blanch time is required before adequate green color retention is accomplished. This zinc concentration/blanch time minimum combination varies with each vegetable. The minimum (−ah) green color value that is visually perceived as adequate is indicated by "o" on the color axis of each of the figures.

Zinc content data of HCST-treated vegetables are depicted in FIGS. 2a through 2f. Vegetable zinc content is directly related to vegetable color, as the comparison of these figures to the corresponding FIGS. 1a through 1f shows. Similarly to the green color, the vegetable zinc content increases with increasing blanch water zinc concentration and increasing blanch time.

Vegetable texture results are displayed in FIGS. 3a through 3f. The texture-enhancing effect of the HCST blanch occurs mostly at the higher zinc concentrations and the longer blanch times. In fresh broccoli, it was only observed at the 9,000 ppm zinc/3 minute blanch time combination.

Example 2

Example 1 was repeated with IQF broccoli using different sources of zinc and/or copper ions for the HCST regreening blanch.

FIG. 4a shows that green color retention can be achieved using cupric sulfate; however, the highest (-ah) level reached was 7.9, compared to 10.9 with zinc chloride (comp. example 1). A bluish tint was observed in the cupric sulfate-treated broccoli samples, which was not found in any of the zinc chloride-treated samples.

FIG. 4b demonstrates the green color results from HCST blanches using a combination of cupric sulfate and zinc chloride, in the ratio of 1:7.5 copper ions:zinc ions. These color results were superior to those with only cupric sulfate but inferior to the green color retention that was accomplished with zinc chloride alone.

Zinc forms other than zinc chloride tested positive with regard to their green color retention potential via the HCST method when blanched for 90 seconds in an aqueous solution containing 1,500 ppm zinc ion concentration. Zinc sulfate-treated IQF broccoli and zinc gluconate-treated IQF broccoli were visually of equivalent green to zinc chloride-treated IQF broccoli. This observation was confirmed by the spectrophotometrical results on green color, as described in the table below.

Green Color of Broccoli Treated With Different Forms of Zinc

| Chemical | Green Color (-ah)* |
| --- | --- |
| Untreated control | -0.65 |
| Zinc sulfate | 7.73 |
| Zinc gluconate | 7.33 |
| Zinc chloride | 7.93 |

*ah = Hunter value a

Example 3

Fresh broccoli florets were processed in a texture-enhancing LTLT blanch, followed by an HCST zinc blanch for green color retention and then preserved through a final drying step.

For the LTLT blanch, broccoli florets were blanched in a 1.5% calcium chloride solution at 145° F. for 4 minutes, and then heated to dry at about 145° F. for 30 minutes. Immediately following, the florets were subjected to an HCST blanch in an aqueous solution of 3,000 ppm zinc ion concentration for 2.5 minutes, at a blanch temperature of 200–212° F. The broccoli was rinsed in cold water for 1 minute and then divided into three portions: One part was dried overnight at 120–130° F., the second part was frozen in a -80° C. freezer (to simulate IQF freezing), and the third part was retorted in brine, as described in Example 1. The next day, the dried florets were retorted in brine, and the frozen florets were thawed and retorted in brine as well.

Texture and green color were measured as described in Example 1; values are shown in the table below.

Texture and Color of LTLT and HCST Blanched and Dried Broccoli

| Treatment | | Texture (Area F*T (Ns))** | Green Color (-ah)*** |
| --- | --- | --- | --- |
| Fresh | Control | 45.3 | 0.0 |
| Fresh | HCST | 57.8 | 9.4 |
| Fresh | LTLT + HCST | 344.8 | 8.9 |
| IQF | Control | 46.5 | -0.1 |
| IQF | HCST | 62.9 | 9.4 |
| IQF | LTLT + HCST | 260.0 | 8.6 |
| Dried | Control | 83.5 | -0.1 |
| Dried | HCST | 105.9 | 7.6 |
| Dried | LTLT + HCST | 473.7 | 7.0 |

**F = force,
T = time,
N = Newton,
s = second;
***ah = Hunter value a

It is apparent that the LTLT blanch as well as the drying process increase broccoli firmness, and that the highest firmness is achieved when both methods are combined. As for green color retention through the HCST blanch, the LTLT process has a slightly negative effect. The drying process causes a slight loss of HCST-achieved green color as well, but the dried HCST broccoli is nevertheless of adequate green color.

Example 4 (Comparative)

Several different prior art methods for the retention of green color were tested in combination with the drying process described in Example 3.

Example 1 of the method of U.S. Pat. No. 4,473,591 by Segner et al. was repeated in that thawed IQF peas were blanched between 180 and 190° F. for 6 minutes in an aqueous solution containing 500 ppm zinc. Examples 1 and 2 of U.S. Pat. No. 5,482,727 of LaBorde et al. were conducted by incubating peas in a waterbath at 65° C. for 30 (Ex. 1) or 60 minutes (Ex. 2) and then blanching them at 212° F. for 5 minutes in an aqueous solution containing 45 (Ex. 1) or 60 ppm zinc (Ex. 2). Subsequently, the blanched peas of each treatment were divided into two halves: One half was immediately retorted in brine, and the other half was dried and retorted in brine the following day. Comparing the dried plus retorted peas to the undried, retorted peas, the green color of the dried peas was equivalent to the color of the undried peas that were treated in the same manner. The table below lists the (-ah) values for the different treatments after retorting.

Prior Art Methods for Green Color Retention Followed By Vegetable Drying

| | Green Color (-ah)* | |
| --- | --- | --- |
| Treatment | Before Drying | Dried |
| Segner | 6.70 | 5.37 |
| LaBorde, example 1 | 3.82 | 3.07 |
| LaBorde, example 2 | 4.10 | 3.76 |

*ah = Hunter value a

Example 5

Green vegetables garnishes identified in the table below were HCST-blanched and subsequently dried. The dried vegetables were shown to have good green color retention when being retorted in brine later.

IQF peas were blanched for 2 minutes in an aqueous zinc chloride solution of 1,500 ppm zinc ion concentration, at 200–212° F. IQF spinach was blanched for 2.5 minutes at the same zinc ion concentration and temperature. Fresh chives were HCST-treated for 2.5 minutes in an aqueous solution containing 3,000 ppm zinc ion. Half of the treated vegetables were retorted right away, the other half was dried as described in example 3. The next day, the dried materials were retorted in brine. The table below lists the result of this experiment after retorting. Green color retention was good with both vegetables and the spice.

Green Color Retention Via HCST Blanch Followed By Drying

| Treatment | Green Color (−ah)* | |
|---|---|---|
| | Before Drying | Dried |
| HCST peas | 6.79 | 4.77 |
| HCST chives | 5.05 | 4.36 |
| HCST spinach | 4.98 | 4.20 |

*ah = Hunter value a

Literature

Decleire, M. 1966. Etude du reverdissement obtenu lors de la sterilisation de haricots prealablement conserves en saumure. (Regreening of green beans sterilized in brine.) *Rev. Ferment. Ind. Aliment.* 21:95–98.

Fischbach, H. 1943. Microdetermination for organically combined metal in pigment of okra. *J. Assoc. Off. Agric. Chem.* 26:139–143.

Fischbach, H.; Newburger, S. H. 1943. Spectrophotometric study of the green color in okra. *J. Assoc. Off. Agric. Chem.* 26:134–139.

Gold, H. J.; Weckel, K. G. 1959. Degradation of chlorophyll to pheophytin during sterilization of canned green peas by heat. *Food Technol.* 13:281–286.

Jones, I. D.; White, R. C.; Gibbs, E.; Butler, L. S.; Nelson, L. A. 1977. Experimental formation of zinc and copper complexes of chlorophyll derivatives in vegetable tissue by thermal processing. *J. Agric. Food Chem.* 25(1):149:153.

MacKinney, G.; Weast, C. A. 1940. Color changes in green vegetables. *Ind. Eng. Chem.* 32:392–395.

Schanderl, S. H.; Marsh, G. L.; Chichester, C. O. 1965. Color reversion in processed vegetables. I. Studies on regreened pea puree. *J. Food Sci.* 30:312–316.

Swirski, M. A.; Allouf, R.; Guimard, A.; Cheftel, H. 1969. A water soluble, stable green pigment, originating during processing of canned brussels sprouts picked before the first autumn frosts. *J. Agric. Food Chem.* 17:799–801.

vonElbe, J. H.; Huang, A. S.; Attoe, E. L.; Nank, W. K. 1986. Pigment composition and color of conventional and Veri-Green canned beans. *J. Agric. Food Chem.* 34:52–54.

Westcott, D. E.; Livingston, G. E.; Esselen, W. B.; Fellers, C. R. 1955. Nonenzymatic discoloration of green bean puree. *Food Technol.* 20:149–159.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

We claim:

1. A method for green color retention in vegetables comprising blanching raw or individually quick frozen (IQF) green vegetables in an aqueous blanch solution at about 150 to 212° F. for less than about three minutes, wherein the aqueous blanch solution has a zinc ion concentration of at least about 500 ppm.

2. The method of claim 1 wherein the zinc ion concentration is between about 750 and 3,000 ppm.

3. The method of claim 2 wherein the zinc ion concentration is between about 1,000 and 3,000 ppm.

4. The method of claim 3 wherein the zinc ion concentration is between about 1,500 and 3,000 ppm.

5. The method of claim 1 comprising blanching the vegetables at about 200 to 212° F.

6. The method of claim 1 wherein the vegetable is selected from the group consisting of asparagus, broccoli, celery, chives, green beans, green peas, and spinach.

7. The method of claim 1 further comprising retorting the vegetables by placing the blanched vegetables into containers, adding a brine solution, and then heating the containers to about 240 to 270° F.

8. The method of claim 1 further comprising containerizing and sterilizing, freezing, or drying the blanched vegetables.

9. The method of claim 8 further comprising containerizing and sterilizing the blanched vegetables.

10. The method of claim 9 wherein the blanched vegetables are containerized as part of a soup or sauce.

11. The method of claim 1 wherein the aqueous blanch solution comprises zinc chloride, zinc sulfate, or zinc gluconate, and water.

12. The method of claim 11 wherein the aqueous blanch solution comprises zinc chloride and water.

13. The method of claim 1 wherein the aqueous blanch solution further comprises copper salts.

14. The method of claim 13 wherein the copper salt is cupric sulfate.

15. The method of claim 1 further comprising pretreating the vegetables with a long-time low-temperature blanch (LTLT) comprising (a) blanching the fresh vegetable for about 2 to 60 minutes at about 125 to 155° F. in water or in an aqueous solution with or without a food grade calcium salt, food grade acid, or both; and (b) optionally, incubating the blanched vegetable for about 0 to 90 minutes at a temperature up to about 155° F.

16. The method of claim 15 wherein the food grade calcium salt is selected from the group consisting of calcium acetate, calcium gluconate, calcium lactate, calcium sulfate, and calcium chloride.

17. The method of claim 15 wherein the acid is selected from the group consisting of ascorbic acid, citric acid, adipic acid, succinic acid, vinegar, acetic acid, phosphoric acid, lactic acid, tartaric acid, malic acid, fumaric acid, and sulfuric acid.

18. A method for green color retention in vegetables comprising blanching raw or individually quick frozen (IQF) green vegetables in an aqueous blanch solution at about 150 to 212° F. for less than about three minutes, wherein the aqueous blanch solution has a copper ion concentration of at least about 500 ppm.

* * * * *